(12) United States Patent
Skogman et al.

(10) Patent No.: US 9,239,401 B2
(45) Date of Patent: Jan. 19, 2016

(54) STATIONARY SOURCE FOR MARINE ELECTROMAGNETIC SURVEYING

(75) Inventors: Carl Joel Gustav Skogman, Jarfalla (SE); Johnathan P. Linfoot, Edinburgh (GB)

(73) Assignee: PGS Geophysical AS, Oslo (NO)

( * ) Notice: Subject to any disclaimer, the term of this patent is extended or adjusted under 35 U.S.C. 154(b) by 229 days.

(21) Appl. No.: 13/409,531

(22) Filed: Mar. 1, 2012

(65) Prior Publication Data
US 2013/0229184 A1 Sep. 5, 2013

(51) Int. Cl.
*G01V 3/12* (2006.01)
*G01V 3/08* (2006.01)

(52) U.S. Cl.
CPC ...................................... *G01V 3/083* (2013.01)

(58) Field of Classification Search
None
See application file for complete search history.

(56) References Cited

U.S. PATENT DOCUMENTS

| | | | |
|---|---|---|---|
| 4,617,518 A | 10/1986 | Srnka et al. | |
| 7,038,456 B2* | 5/2006 | Ellingsrud et al. | 324/334 |
| 7,109,717 B2* | 9/2006 | Constable | 324/337 |
| 7,337,064 B2 | 2/2008 | MacGregor et al. | |
| 7,446,535 B1 | 11/2008 | Tenghamn et al. | |
| 7,483,792 B2 | 1/2009 | MacGregor et al. | |
| 7,529,627 B2 | 5/2009 | Lisitsyn et al. | |
| 7,541,996 B2 | 6/2009 | Fielding et al. | |
| 7,659,721 B2 | 2/2010 | MacGregor et al. | |
| 7,675,290 B2 | 3/2010 | MacGregor et al. | |
| 7,679,367 B2 | 3/2010 | MacGregor et al. | |
| 7,692,429 B2* | 4/2010 | MacGregor et al. | 324/365 |
| 7,737,698 B2 | 6/2010 | Tenghamn et al. | |
| 7,834,632 B2* | 11/2010 | Tenghamn et al. | 324/365 |
| 7,884,612 B2 | 2/2011 | Conti et al. | |
| 7,924,014 B2 | 4/2011 | MacGregor et al. | |
| 8,008,921 B2 | 8/2011 | Alumbaugh et al. | |
| 8,026,723 B2* | 9/2011 | Loehken et al. | 324/350 |
| 8,030,934 B2 | 10/2011 | Barsukov et al. | |
| 8,228,066 B2* | 7/2012 | Ellingsrud et al. | 324/323 |

(Continued)

FOREIGN PATENT DOCUMENTS

| | | |
|---|---|---|
| EP | 2068176 A2 | 6/2009 |
| EP | 2372401 A1 | 10/2011 |

(Continued)

OTHER PUBLICATIONS

United Kingdom Search Report, Date of Search: Aug. 8, 2013.

(Continued)

*Primary Examiner* — Jermele M Hollington (57) ABSTRACT

Disclosed are methods and systems for using electromagnetic sources that are substantially stationary in a body of water while electromagnetic field signals are detected with electromagnetic sensors towed through the body of water. An embodiment discloses an apparatus comprising: a vessel; a first electromagnetic source coupled to the vessel and configured to have a dipole moment oriented in a first direction; and a second electromagnetic source coupled to the vessel and configured to have a dipole moment oriented in a second direction, wherein the second direction is generally orthogonal to the first direction. Another embodiment discloses a system comprising: a sensor streamer configured for towing in a body of water, wherein the sensor streamer comprises a plurality of electromagnetic sensors disposed at spaced apart positions; and an electromagnetic source assembly configured for deployment at a substantially stationary position in the body of water.

36 Claims, 4 Drawing Sheets

(56) References Cited

U.S. PATENT DOCUMENTS

| | | |
|---|---|---|
| 2006/0091889 A1 | 5/2006 | Ellingsrud et al. |
| 2007/0255499 A1 | 11/2007 | Strack et al. |
| 2008/0071709 A1 | 3/2008 | Strack |
| 2008/0136420 A1 | 6/2008 | Velikhov et al. |
| 2008/0239875 A1 | 10/2008 | Alumbaugh et al. |
| 2008/0265896 A1* | 10/2008 | Strack et al. ............... 324/350 |
| 2008/0309346 A1* | 12/2008 | MacGregor et al. .......... 324/334 |
| 2009/0015262 A1* | 1/2009 | Strack et al. ............... 324/348 |
| 2009/0265111 A1 | 10/2009 | Helwig et al. |
| 2009/0315563 A1 | 12/2009 | Fox et al. |
| 2010/0019770 A1* | 1/2010 | Hansen ....................... 324/337 |
| 2010/0026304 A1 | 2/2010 | Duncan |
| 2010/0045295 A1 | 2/2010 | Mittet et al. |
| 2010/0057363 A1 | 3/2010 | Amundsen |
| 2010/0061187 A1* | 3/2010 | Sodal ......................... 367/131 |
| 2010/0172205 A1 | 7/2010 | Hillesund et al. |
| 2010/0271029 A1 | 10/2010 | Fainberg et al. |
| 2011/0227579 A1 | 9/2011 | Morrison et al. |
| 2011/0273179 A1 | 11/2011 | Sudow |
| 2011/0291658 A1* | 12/2011 | Skogman et al. ............ 324/337 |
| 2011/0296908 A1 | 12/2011 | Kjerstad |
| 2012/0038362 A1 | 2/2012 | Kjerstad et al. |
| 2013/0162256 A1* | 6/2013 | Hobbs ......................... 324/334 |
| 2013/0300421 A1* | 11/2013 | Dell'Aversana et al. ..... 324/365 |

FOREIGN PATENT DOCUMENTS

| | | |
|---|---|---|
| GB | 2458959 A | 7/2009 |
| GB | 2480149 A | 9/2011 |
| GB | 2488658 A | 9/2012 |
| GB | 2498078 A | 3/2013 |
| GB | 2501359 A | 10/2013 |
| WO | 0214906 A1 | 2/2002 |
| WO | WO0214906 A1 | 2/2002 |
| WO | 2008134599 A1 | 11/2008 |
| WO | WO2010080834 A2 | 7/2010 |
| WO | WO2012106483 A2 | 8/2012 |

OTHER PUBLICATIONS

"Loop antenna", from Wikipedia, the free encyclopedia, pp. 1-7, retrieved from "http://en.wikipedia.org/wiki/Loop_antenna", dated Jan. 17, 2012.

United Kingdom Search Report issued in the prosecution of patent application No. GB1302923.6, mailed Nov. 16, 2014, 5 pages.

GB Examination Report mailed May 13, 2015, in the prosecution of patent application No. GB1302923.6, 3 pages.

GB Examination Report mailed Apr. 28, 2015, in the prosecution of patent application No. GB1504107.2, 7 pages.

* cited by examiner

STATIONARY SOURCE FOR MARINE ELECTROMAGNETIC SURVEYING

BACKGROUND

Marine electromagnetic surveying is a geophysical survey technique that uses electromagnetic energy to identify possibly hydrocarbon-bearing rock formations below the bottom of a body of water, such as a lake or ocean. In one example of a marine electromagnetic survey system, an electromagnetic source may be towed at a selected depth in the body of water while a number of electromagnetic sensors are disposed at a substantially stationary position at the water bottom. The survey can be conducted for a range of electromagnetic source and electromagnetic sensor positions. The electromagnetic source can be actuated while towed through the water to emit an electric field that propagates outwardly into the water and downwardly into formations below the water bottom. The electromagnetic sensors detect and record electromagnetic field signals that can be used to infer certain properties of the subsurface rock, such as structure, mineral composition and fluid content, thereby providing information useful in the recovery of hydrocarbons.

Drawbacks to electromagnetic survey systems that use stationary sensors may include limited data acquisition due, for example, to a practical limit on the number of sensors that can be deployed at given time. Additional drawbacks may include the sensitivity of the stationary sensors to variations in the topography of the water bottom. To address these and other drawbacks with stationary sensors, electromagnetic survey systems have been developed that include towing both the electromagnetic source and the electromagnetic sensors through the water. Despite more dense data coverage and less sensor sensitivity to variations on the water bottoms, these towed systems may also have drawbacks. For example, there may be less flexibility in selected source and sensor positions to obtain data on targets from different angles. In addition, towed systems may also have increased induction noise due to movement of both the source and sensors through the water. Also towed systems typically may only measure the inline component of the electric field because the source and sensors may only have electrodes spaced apart in the towing direction.

Accordingly, there is a need for improved methods and systems for marine electromagnetic surveying.

BRIEF DESCRIPTION OF THE DRAWINGS

These drawings illustrate certain aspects of some of the embodiments of the present invention and should not be used to limit or define the invention.

DETAILED DESCRIPTION

The present invention relates generally to the field of marine electromagnetic surveying. More particularly, in one or more embodiments, the present invention relates to methods and systems for using electromagnetic sources that are substantially stationary in a body of water while electromagnetic field signals are detected with electromagnetic sensors towed through the body of water.

Figure 1:
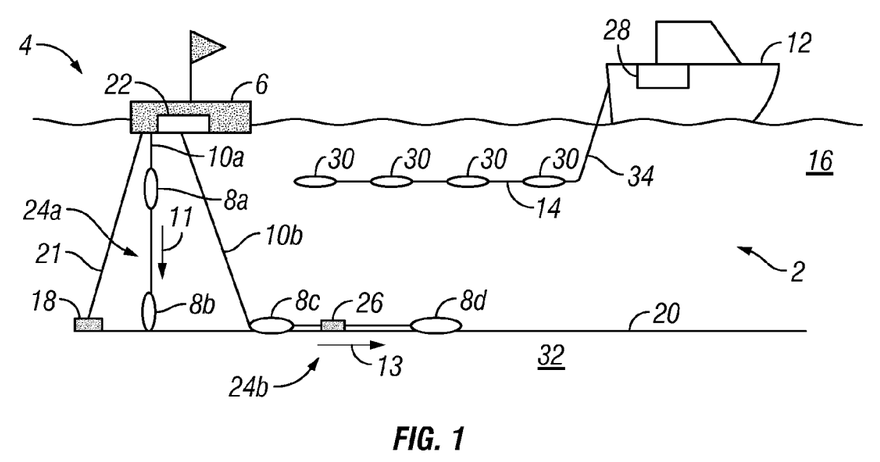
FIG. 1 illustrates an example embodiment of a marine electromagnetic survey system comprising a substantially stationary electromagnetic source.

Referring now to FIG. 1, a marine electromagnetic survey system 2 is illustrated in accordance with one embodiment of the present invention. As illustrated, the survey system 2 may comprise an electromagnetic source assembly 4, which is substantially stationary. The electromagnetic source assembly 4 may comprise a vessel 6 and electromagnetic source electrodes 8a, 8b, 8c, 8d coupled to the vessel 6 by source cables 10a, 10b. In present embodiments, the electromagnetic source assembly 4 may be considered a multi-component source because the source electrodes 8a, 8b, 8c, 8d are spaced in different orthogonal directions, as will be discussed in more detail below. The survey system 2 may also comprise a survey vessel 12 that may tow sensor streamer 14 through a body of water 16, such as a lake or ocean.

In the present example, the vessel 6 may be disposed at or near the surface of the body of water 16. Among other things, the vessel 6 may be used to position the source electrodes 8a, 8b, 8c, 8d in a substantially stationary position in the body of water 16. The vessel 6 may be any of a variety of different vessels suitable for securing the electrodes 8a, 8b, 8c, and 8d in a substantially stationary position, including, for example, a floating container, a ship, or a boat. As illustrated, an anchor 18 may be used to secure the vessel 6 to the water bottom 20, thus preventing the vessel 6 from moving due to wind and/or current in the water 16, thereby holding the vessel 6 substantially stationary. A line 21 may couple the anchor 18 to the vessel 6. While FIG. 1 illustrates the use of an anchor 18 to secure the vessel 6 in a substantially stationary position in the body of water 16, other suitable means may also be used to hold the vessel 6 in a substantially stationary position in the body of water 16. For example, the vessel 6 may include a propulsion system and/or steering system (not shown) that could be used to maintain the vessel 6 in a substantially stationary position in the body of water 16. The vessel 6 may include equipment, shown generally at 22 and generally referred to as "source equipment." The source equipment 22 may include devices (none shown separately) for applying electric current to the electromagnetic source electrodes 8a, 8b, 8c, 8d, determining the position of the vessel 6, measuring the applied current, measuring auxiliary data e.g. water conductivity, background noise (which could include separate electrodes for this purpose, attached with cables and spread out like the source electrodes) and radio transmitters and receivers for transferring data. In some embodiments, the source equipment 22 may include devices (e.g., a magnetotelluric station) for measuring electric and/or magnetic fields from electromagnetic radiation caused by naturally occurring phenomena. In some embodiments, the length of line 21 or the propulsion system and/or steering system (not shown) may be adjusted to maintain vessel 6 at a particular depth in the body of water 16.

As illustrated, the electromagnetic source electrodes 8a, 8b, 8c, 8d may be coupled to the vessel 6. In accordance with present embodiment, the electromagnetic source electrodes 8a, 8b, 8c, 8d may be held at a substantially stationary position in the body of water 16. The term "substantially stationary" is not intended to imply that the source electrodes 8a, 8b, 8c, 8d do not experience any movement in the body of water 16. It is understood that the electrodes 8a, 8b, 8c, 8d may experience some slight movement in the water 16 due to tides, current, and/or waves. However, the vessel 6, as discussed above is held substantially stationary in the body of water 16, such that the source electrodes 8a, 8b, 8c, 8d are not allowed to drift due to current and/or wind and are also not being actively towed through the body of water 16. In accordance with present embodiments, the electromagnetic survey may be conducted for a range of positions for the electromagnetic source electrodes 8a, 8b, 8c, 8d.

In the illustrated embodiment, the electromagnetic source electrodes 8a, 8b, 8c, 8d may form two electromagnetic sources 24a, 24b. The first electromagnetic source 24a may comprise a pair of the electromagnetic source electrodes 8a, 8b configured to have a dipole moment oriented in a first direction 11. As illustrated, the electromagnetic source electrodes 8a, 8b may be longitudinally spaced on source cable 10a in the first direction 11, as shown in FIG. 1. In some embodiments, the first direction 11 may be generally orthogonal to the direction of movement of the survey vessel 12. A direction being "generally orthogonal" to another direction means that the direction is oriented at an angle of from about 80° to about 100° with respect to the other direction. In the illustrated embodiment, the source electrodes 8a, 8b may be held by the source cable 10a at different depths in the body of water 16. At selected times, the electromagnetic source electrodes 8a, 8b may be actuated such that the first electromagnetic source 24a may emit an electromagnetic field. For example, the source equipment 22 may pass electric current between the source electrodes 8a, 8b to generate the electric field with a dipole moment oriented in the first direction 11. In some embodiments, the first electromagnetic source 24a may be configured emit the electromagnetic field contemporaneously with the generation of response signals by the electromagnetic sensors 30 towed by the vessel 12.

The second electromagnetic source 24b may comprise another pair of the electromagnetic source electrodes 8c, 8d configured to have a dipole moment oriented in a second direction 13. The electromagnetic source electrodes 8c, 8d may be longitudinally spaced on the source cable 10b in the second direction 13, as shown in FIG. 1. The second direction 13 may be generally orthogonal to the first direction 11. In some embodiments, the second direction 13 may be generally parallel to the direction of movement of the survey vessel 12. A direction being "generally parallel" to another direction means that the direction is oriented within about 10° of the other direction. As illustrated, the source electrodes 8c, 8d may be positioned on the source cable 10b along the water bottom 20. An anchor 26 may be used to secure the source cable 10b to the water bottom 20. The source electrodes 8c, 8d of the second electromagnetic source 24b may be longitudinally spaced in a direction that is generally orthogonal to the direction in which the source electrodes 8a, 8b are spaced. At selected times, the electromagnetic source electrodes 8c, 8d may be actuated such that the second electromagnetic source 24b may emit an electromagnetic field. For example, the source equipment 22 may pass electric current between the source electrodes 8c, 8d to generate the electric field with a dipole moment oriented in the second direction 13. In some embodiments, the second electromagnetic source 24b may be configured emit the electromagnetic field contemporaneously with the generation of response signals by the electromagnetic sensors 30 towed by the vessel 12. FIG. 1 illustrates an embodiment wherein both source 24a and source 24b are connected to source equipment 22. Other embodiments include additional source equipment 22b (not shown), such that source 24a may be connected to source equipment 22, while source 24b is connected to additional source equipment 22b (not shown). In some embodiments, additional source equipment 22b (not shown) is located on an additional vessel (not shown). While FIG. 1 illustrates the electromagnetic sources 24a, 24b as spaced apart electrodes 8a, 8b, 8c, 8d, it should be understood that other suitable electromagnetic sources may also be used for transmitting an electromagnetic field in accordance with embodiments of the present invention, including, for example, solenoid coils and loop transmitters, among others. An example of a loop transmitter is described in more detail below with respect to FIG. 8.

As illustrated, the survey vessel 12 may move along the surface of the body of water 16. The survey vessel 12 may include thereon equipment, shown generally at 28 and referred to for convenience as a "recording system." The recording system 28 may include devices (none shown separately) for navigation of the survey vessel 12, for determining position of the survey vessel 12, and for recording signals generated by the electromagnetic sensors 30.

In the present example, the survey vessel 12 may tow the sensor streamer 14 through the body of water 16 while the electromagnetic source electrodes 8a, 8b, 8c, 8d may be held substantially stationary in the body of water 16. While FIG. 1 illustrates only a single sensor streamer 14, the survey vessel 12 may tow more than one sensor streamer 14 in accordance with present embodiments. For example, the survey vessel 12 may tow two or more sensor streamers 14 in accordance with present embodiments. The sensor streamer 14 may be coupled to the survey vessel 12 by lead-in line 34, as shown in FIG. 1. As illustrated, the sensor streamer 14 may comprise a plurality of electromagnetic sensors at spaced apart positions. By way of example, the electromagnetic sensors 30 may include, without limitation, any of a variety of electromagnetic field sensors, such as electrodes or magnetometers. The electromagnetic sensors 30 may generate response signals, such as electrical or optical signals, in response to detecting changes in the electric field generated by the electromagnetic sources 24a, 24b due to interaction of the electric field with rock formations 32 beneath the water bottom 20. Suitable amplification, data formatting, and telemetry devices (none shown) may be included in the sensor streamer 14 to communication the response signals to the recording system 28. The sensor streamer 14 may comprise one or more additional components (none shown) suitable for use in geophysical survey systems, such as lateral force and depth control devices, depth sensors, tilt sensors, seismic sensors, and hydrodynamic depressors, as will be appreciated by those of ordinary skill in the art with the benefit of this disclosure. While not illustrated, the survey vessel 12 may also tow a seismic source in some embodiments.

Figure 2:
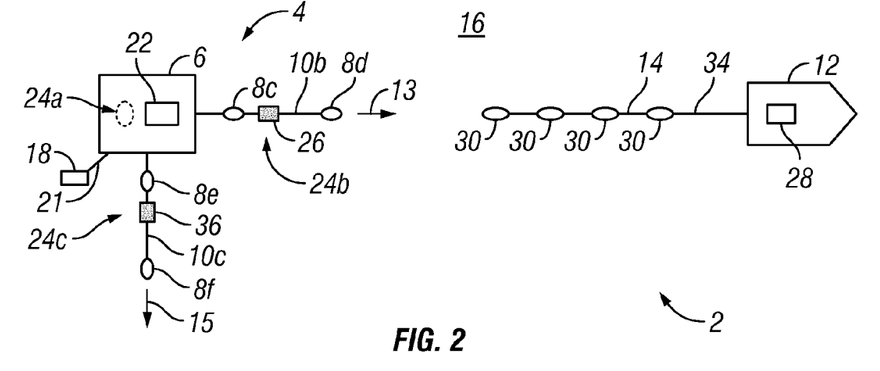
FIG. 2 illustrates another example embodiment of a marine electromagnetic survey system comprising a substantially stationary electromagnetic source.

Referring now to FIG. 2, an alternative embodiment of a marine electromagnetic survey system 2 is illustrated in accordance with one embodiment of the present invention. In the present embodiment, the electromagnetic source assembly 4 may further comprise a third electromagnetic source 24c. As illustrated, the third electromagnetic source 24c may comprise a third pair of electromagnetic source electrodes 8e, 8f coupled to the vessel 6 (or an additional vessel, not shown) by source cable 10c. The electromagnetic source electrodes 8e, 8f may be longitudinally spaced on the source cable 10c in a third direction 15 wherein the electromagnetic source electrodes 8c, 8d are configured to have a dipole moment oriented in the direction 15. The third direction 15 may be generally orthogonal to the first direction 11 and the second direction 13, for example. In the present example, the source electrodes 8e, 8f may be positioned on the source cable 10c along or near the water bottom 20 (e.g., FIG. 1). An anchor 36 may be used to secure the source cable 10c to or near the water bottom 20. At selected times, the electromagnetic source electrodes 8e, 8f may be actuated such that the third electromagnetic source 24c emits an electromagnetic field. In some embodiments, the third electromagnetic source 24c may be configured emit the electromagnetic field contemporaneously with the generation of response signals by the electromagnetic sensors 30 towed by the vessel 12. For example, the source equipment 22 may pass electric current between the source electrodes 8e, 8f to generate the electric field with the dipole moment oriented in the third direction 15.

Figure 3:
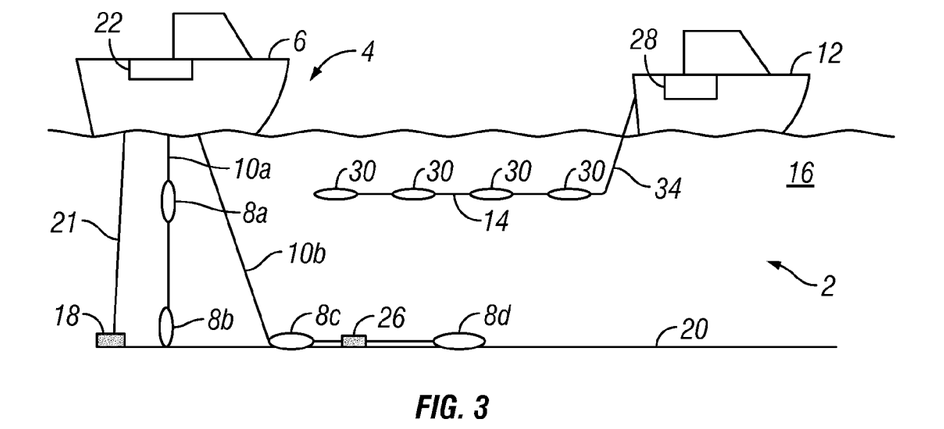
FIG. 3 illustrates another example embodiment of a marine electromagnetic survey system comprising a substantially stationary electromagnetic source.

Referring now to FIG. 3, an alternative embodiment of a marine electromagnetic survey system 2 is illustrated. In the present embodiment, the vessel 6 for positioning the source electrodes 8a, 8b, 8c, 8d in a substantially stationary position in the body of water 16 is a ship or boat rather than a floating container (e.g., FIG. 1). As illustrated, an anchor 18 may secure the vessel 6 to the water bottom 20. A line 21 may secure the anchor 18 to the vessel. By securing the vessel 6 to the water bottom 20, the vessel 6 should not move due to wind and/or current in the water 16 thereby holding the vessel 6 and, in turn, the source electrodes 8a, 8b,8c, 8d substantially stationary. While FIG. 3 illustrates the use of an anchor 18 to secure the vessel 6 in a substantially stationary position in the body of water 16, other suitable means may also be used to hold the vessel 6 in a substantially stationary position in the body of water 16. For example, vessel 6 may include a propulsion system and/or steering system that could be used to maintain the vessel 6 in a substantially stationary position in the body of water 16. The vessel 6 may include source equipment 22, such as devices (none shown separately) for applying electric current to the electromagnetic source electrodes 8a, 8b, 8c, 8d and for determining the position of the vessel 6.

Figure 4:
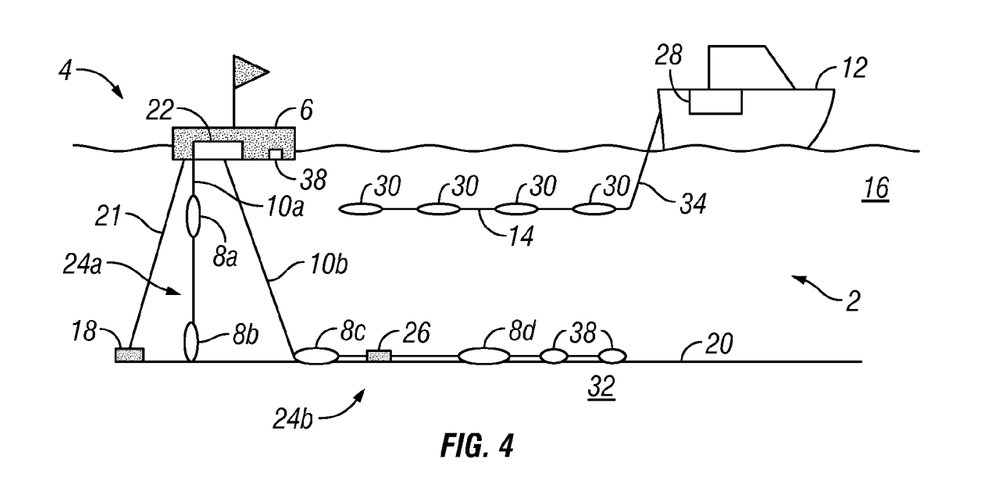
FIG. 4 illustrates another example embodiment of a marine electromagnetic survey system comprising a substantially stationary electromagnetic source.

Referring now to FIG. 4, an alternative embodiment of a marine electromagnetic survey system 2 is illustrated in which the source assembly 4 comprises electromagnetic sensors 38 coupled to the vessel 6. In the present embodiment, one of the electromagnetic sensors 38 may be located on the source cable 10b adjacent to the second electromagnetic source 24b. As illustrated, one of the electromagnetic sensors 38 may be positioned on the source cable 10b along the water bottom 20. Another one of the electromagnetic sensors 38 may be positioned on the vessel 6 in addition to or separately from the one of the electromagnetic sensors 38 on the source cable 10b, for example. The electromagnetic sensors 38 may include, without limitation, any of a variety of electromagnetic field sensors, such as electrodes or magnetometers. The electromagnetic sensors 38 may be held at a substantially stationary position in a manner similar to the source electrodes 8a, 8b, 8c, 8d. In present embodiment, the electromagnetic sensors 38 may be used to provide background noise characteristics about the area. For example, the electromagnetic sensors 38 may take measurements while the source electrodes 8a, 8b, 8c, 8d are not operational, either between transmission periods or while the survey vessel 12 is positioning the sensor streamer 14.

Figure 5:
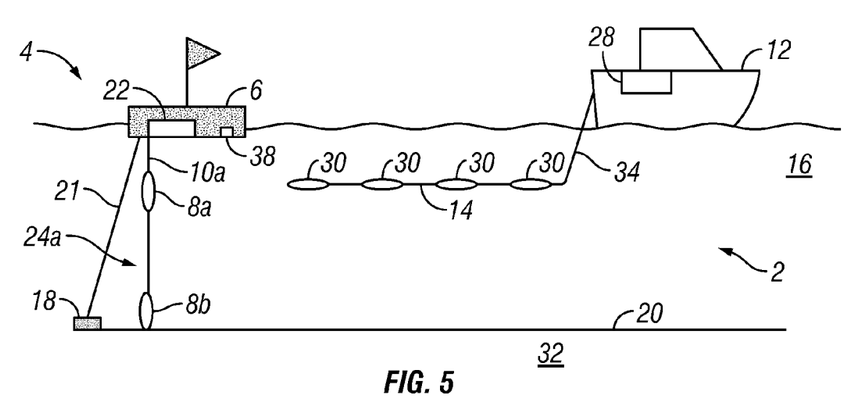
FIG. 5 illustrates yet another example embodiment of a marine electromagnetic survey system comprising a substantially stationary electromagnetic source.

While FIGS. 1-4 illustrate, a marine electromagnetic survey system 2 comprising two or more electromagnetic sources (e.g., electromagnetic sources 24a, 24b, and/or 24c), it should be understood that embodiments of the present invention may include a marine electromagnetic survey system 2 that is substantially stationary and that comprises only one electromagnetic source 24a. FIG. 5 illustrates a marine electromagnetic survey system 2 that comprises only one electromagnetic source 24a. As illustrated, the electromagnetic source 24a may comprise a pair of the electromagnetic source electrodes 8a, 8b. In the illustrated embodiment, the electromagnetic source electrodes 8a, 8b may be longitudinally spaced on the source cable 10a. As shown by FIG. 5, the electromagnetic source electrodes 8a, 8b may be held by the source cable 10a at different depth in the body of water 16. In alternative embodiments (not shown), the electromagnetic source electrodes 8a, 8b may be positioned on the source cable 10a along the water bottom 20 with an anchor, for example, securing the source cable 10a to the water bottom 20.

Figure 6:
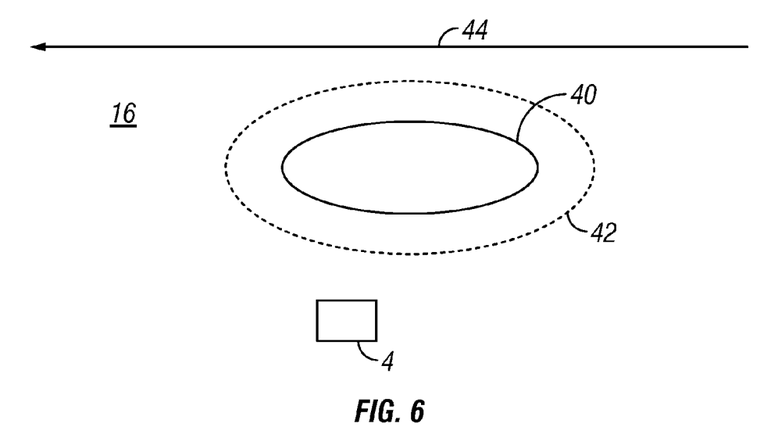
FIG. 6 illustrates a target area below a screening body in accordance with example embodiments of methods of the present invention.

FIG. 6 illustrates a top view of a target area below a screening body in accordance with embodiments of methods of the present invention. In present embodiments, a target area 40 for the survey may be located in subsurface formations below a screening body 42. The screening body 42 may be, for example, very resistive and deform the electromagnetic fields in such a way that much less electromagnetic energy passes there through. Accordingly, inferring properties of the target area 40 may be difficult with use of conventional electromagnetic survey techniques. The screening body 42 may be a salt body, an igneous rock formation, a non-commercial hydrocarbon body, shallow gas, a carbonate reef, or any other type of body that hampers or in any way interferes with the identification of hydrocarbons located underneath the screening body 42. In some embodiments, screening body 42 may be below the water bottom (e.g., 20 in FIGS. 1-4). In other embodiments, screening body may be at or near the water bottom (e.g., 20 in FIGS. 1-4). While the target area 40 and screening body 42 are shown as being generally elliptical in shape, it should be understood that the present invention is not limited to target areas or screening bodies having this shape but is intended to encompass target areas and screening bodies having a variety of different shapes such that the screening body 42 may undesirably screen the target area 40 from an electromagnetic survey.

In operation, a target area 40 for the electromagnetic survey may be identified. As illustrated, the target area 40 may be located beneath the screening body 42. To survey the target area 40 underneath the screening body 42, the electromagnetic source assembly 4 may be positioned on one side of (and typically above) the screening body 42. The survey line 44 may then be run on the opposite side of (and typically above) the screening body 42. In some embodiments, the survey line 44 may be run generally parallel to the length of the screening body 42. In this manner, the survey vessel 12 (e.g., FIG. 1) may tow the sensor streamer 14 through the body of water 16 on the opposite side of the screening body 42 from the electromagnetic source assembly 4. If desired, the electromagnetic source assembly 4 may be repositioned, and the survey line 44 may be rerun, for example, to obtain additional data about the target area 40. In one embodiment, the source assembly 4 may be moved to the other side of the screening body 42 with the survey line 44 rerun on the side of the screening body 42 on which the source assembly 4 was originally positioned.

Figure 7:
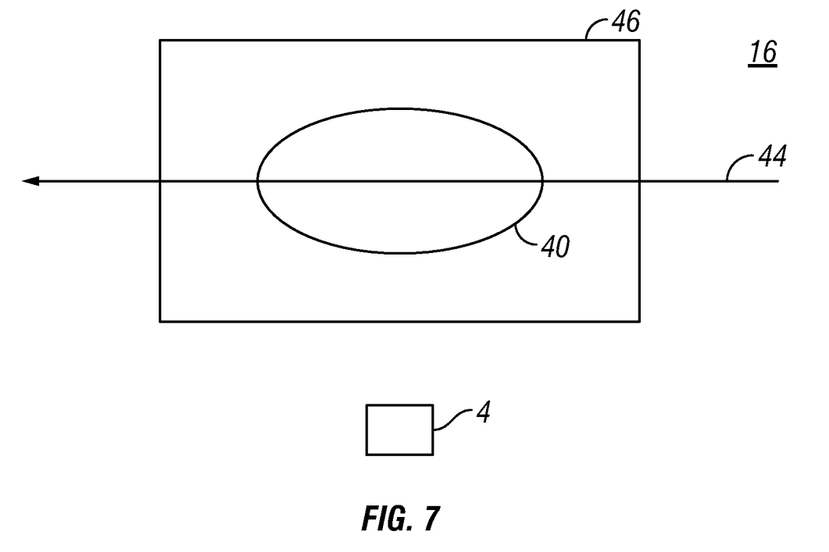
FIG. 7 illustrates a target area in an environmental zone in which EM source discharges may be restricted in accordance with example embodiments of methods of the present invention.

FIG. 7 illustrates a top view of a target area in an environmental zone in which EM source discharges may be restricted in accordance with embodiments of methods of the present invention. In the present embodiment, a target area 40 for the survey may be disposed beneath the water bottom (e.g., 20 in FIGS. 1-4) in an environmental zone 46 of the body of water 16. In the environmental zone 46, the discharge of electromagnetic energy may be restricted or otherwise controlled. In operation, the target area 40 for the electromagnetic survey may be identified. As illustrated, the target area 40 may be located in subsurface formations below the environmental zone 46. To survey the target area 40 in the environmental zone 46, the electromagnetic source assembly 4 may be positioned outside the environmental zone 46. The survey line 44 may then be run through (or above) the environmental zone 46. In this manner, the survey vessel 12 (e.g., FIG. 1) may tow the sensor streamer 14 through (or above) the environmental zone 46 in the body of water 16. If desired, the electromagnetic source assembly 4 may be repositioned, and the survey line 44 may be rerun, for example, to obtain additional data about the target area 40. In one embodiment, the source assembly 4 may be moved to another side of the environmental zone 46 with the survey line 44 again run through (or above) the environmental zone 46.

Figure 8:
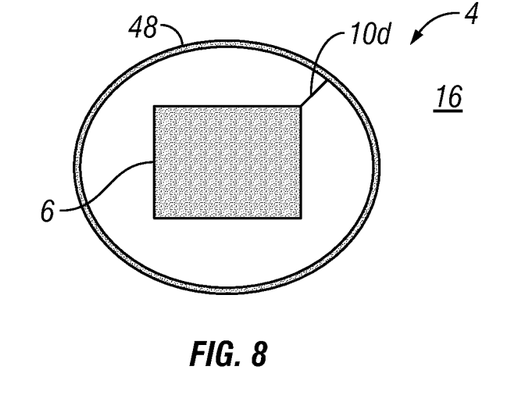
FIG. 8 illustrates one example embodiment of an electromagnetic source assembly comprising a magnetic loop source.

Referring now to FIG. 8, an electromagnetic source assembly 4 comprising a magnetic loop source 48 is illustrated in a top view in accordance with one embodiment of the present invention. In some embodiments, the magnetic loop source 48 may be in addition to the electromagnetic sources 24a, 24b, and 24c, which may be coupled to the electromagnetic source assembly 4 (e.g., as in FIG. 2). A source cable 10d may secure the magnetic loop source 48 to the vessel 6 at a particular depth in the body of water 16, including at or near the water bottom 20. The magnetic loop source 48 may comprise a loop or loops of wire, tubing, or other electrical conductor with its ends connected to the source cable 10d. In present embodiments, the magnetic loop source 48 may be held in a substantially stationary position in the body of water 16. At selected times, the magnetic loop source 48 may be actuated such that the magnetic loop source 48 emits an electromagnetic field.

One of the many potential advantages of the systems and methods of the present invention, only some of which are disclosed herein, is that the electromagnetic source assembly may be a multi-component source with two or three orthogonal components thus yielding more information about the electric field which can improve interpretation results. In addition, by having two or three field components, airwave reduction techniques may be beneficially used in processing the data. Another one of the many potential advantages is that the reduction of the signal by conductive water may be lessened yielding a better signal-to-noise ratio since the electromagnetic source may be positioned at the water bottom.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed is:

1. An apparatus for geophysical surveying comprising:
   a vessel, wherein the vessel is a container, boat, or ship, wherein the vessel is configured for deployment at a substantially stationary position in a body of water, wherein the vessel is secured with an anchor to a bottom of the body of water;
   a first electromagnetic source coupled to the vessel and configured to have a dipole moment oriented in a first direction; and
   a second electromagnetic source coupled to the vessel and configured to have a dipole moment oriented in a second direction, wherein the second direction is generally orthogonal to the first direction.

2. The apparatus of claim 1 wherein the first electromagnetic source and the second electromagnetic source are each coupled to the vessel by separate source cables.

3. The apparatus of claim 2 wherein the vessel is a floating container configured for positioning at a substantially stationary position in a body of water.

4. The apparatus of claim 1 wherein the first electromagnetic source comprises a pair of electrodes configured for spacing along a source cable in the first direction, and wherein the second electromagnetic source comprises a pair of electrodes configured for spacing along a source cable in the second direction.

5. The apparatus of claim 4 wherein the pair of electrodes of the first electromagnetic source are configured for placement at different depths in the body of water, and wherein the pair of electrodes of the second electromagnetic source are configured for placement along or near a bottom of the body of water.

6. The apparatus of claim 1 further comprising electromagnetic sensors coupled to the vessel.

7. The apparatus of claim 1 wherein the apparatus further comprises a magnetic loop source secured to the vessel.

8. The apparatus of claim 4 wherein the pair of electrodes of the first electromagnetic source are configured for placement at different depths in the body of water, and wherein the pair of electrodes of the second electromagnetic source are configured for placement along or near a bottom of the body of water, and wherein the pair of electrodes of the third electromagnetic source are configured for placement along or near a bottom of the body of water.

9. An apparatus for geophysical surveying comprising:
   a vessel, wherein the vessel is a container, boat, or ship, wherein the vessel is configured for deployment at a substantially stationary position in a body of water;
   a first electromagnetic source coupled to the vessel and configured to have a dipole moment oriented in a first direction; and
   a second electromagnetic source coupled to the vessel and configured to have a dipole moment oriented in a second direction, wherein the second direction is generally orthogonal to the first direction wherein the first electromagnetic source comprises a pair of electrodes configured for spacing along a source cable in the first direction, and wherein the second electromagnetic source comprises a pair of electrodes configured for spacing along a source cable in the second direction wherein the apparatus further comprises a third electromagnetic source comprising a pair of electrodes configured for spacing along a source cable in a third direction, wherein the third direction is generally orthogonal to the first and second directions.

10. The apparatus of claim 9 wherein the first electromagnetic source, the second electromagnetic source, and the third electromagnetic source are each coupled to the vessel by separate source cables.

11. The apparatus of claim 9 wherein the vessel is the container configured for positioning at the substantially stationary position in the body of water with an anchor secured to a bottom of the body of water.

12. The apparatus of claim 9 further comprising electromagnetic sensors coupled to the vessel.

13. The apparatus of claim 9 wherein the apparatus further comprises a magnetic loop source secured to the vessel.

14. A system for geophysical surveying comprising:
a sensor streamer configured for towing in a body of water, wherein the sensor streamer comprises a plurality of electromagnetic sensors disposed at spaced apart positions, wherein the electromagnetic sensors are configured to detect changes in an electric field; and
an electromagnetic source assembly configured for deployment at a substantially stationary position in the body of water.

15. The system of claim 14 further comprising a survey vessel configured for towing the sensor streamer in the body of water.

16. The system of claim 15 wherein the electromagnetic source assembly comprises:
a vessel configured for placement at a substantially stationary position in the body of water;
a first electromagnetic source comprising a pair of electrodes longitudinally spaced on a first source cable in a first direction, wherein the first source cable is secured to the vessel; and
a second electromagnetic source comprising a pair of electrodes longitudinally spaced on a second source cable in a second direction, wherein the second direction is generally orthogonal to the first direction, wherein the second source cable is secured to the vessel.

17. The system of claim 16 wherein the electrodes of the first electromagnetic source are configured for placement at different depths in the body of water.

18. The system of claim 17 wherein the electrodes of the second electromagnetic source are configured for placement along or near a bottom of the body of water.

19. The system of claim 16 wherein the electromagnetic source assembly further comprises a third electromagnetic source comprising a pair of electrodes longitudinally spaced on a third source cable in a direction generally orthogonal to the first and second directions, wherein the third source cable is secured to the vessel.

20. The system of claim 16 wherein the electromagnetic source assembly further comprises a magnetic loop source secured to the vessel.

21. The method of claim 16 wherein the vessel configured for placement at the substantially stationary position in the body of water is a container, a ship or a boat.

22. A method of electromagnetic surveying comprising:
actuating one or more electromagnetic sources while substantially stationary in a body of water; and
detecting electromagnetic field signals at electromagnetic sensors towed through the body of water.

23. The method of claim 22 further comprising positioning a first pair of source electrodes in a substantially stationary position in the body of water such that the first pair of the source electrodes are longitudinally spaced on a first source cable in a first direction, and positioning a second pair of source electrodes in a substantially stationary position in the body of water such that the second pair of the source electrodes are longitudinally spaced on a second source cable in a second direction, wherein the second direction is generally orthogonal to the first direction.

24. The method of claim 22 further comprising identifying a target area for an electromagnetic survey wherein the target area is positioned underneath a screening body, and towing the electromagnetic sensors on one side of the screening body while the one or more electromagnetic sources are positioned on an opposite side of the screening body.

25. The method of claim 22 further comprising towing the electromagnetic sensors over an environmental zone in which electromagnetic source discharges are restricted while the electromagnetic source is positioned outside the environmental zone.

26. The method of claim 22 wherein the one or more electromagnetic sources are secured to a vessel that is substantially stationary in the body of water, wherein the vessel is a container, a ship or a boat anchored to a water bottom.

27. The method of claim 22 further comprising using a steering and/or propulsion system to maintain a vessel coupled to the one or more electromagnetic sources in a substantially stationary position.

28. The method of claim 22 further comprising repositioning the one or electromagnetic sources in the body of water, and then repeating the steps of actuating the one or more electromagnetic sources and detecting electromagnetic field signals.

29. The method of claim 24 further comprising moving the one or more electromagnetic sources to the side of the screening body on which the electromagnetic sensors were towed and then towing the electromagnetic sensors on the opposite side of the screening body.

30. An apparatus for geophysical surveying comprising:
a first electromagnetic source configured for deployment at a substantially stationary position in a body of water and configured to have a dipole moment oriented in a first direction;
a second electromagnetic source configured for deployment at a substantially stationary position in the body of water and configured to have a dipole moment oriented in a second direction, wherein the second direction is generally orthogonal to the first direction; and
a third electromagnetic source configured for deployment at a substantially stationary position in the body of water and configured to have a dipole moment oriented in a third direction, wherein the third direction is generally orthogonal to the first direction and the second direction.

31. The apparatus of claim 30 wherein the first electromagnetic source comprises a pair of electromagnetic source electrodes spaced on a first source cable, wherein the second electromagnetic source comprises a pair of electromagnetic source electrodes spaced on a second source cable, and wherein the third electromagnetic source comprises a pair of electromagnetic source electrodes spaced on a third source cable.

32. The apparatus of claim 31 wherein the first source cable, the second source cable, and the third source cable are coupled to a vessel.

33. The apparatus of claim 32 wherein the vessel is a container, a ship or a boat.

34. The apparatus of claim 31 further comprising electromagnetic sensors coupled to the vessel.

35. The apparatus of claim 31 wherein the apparatus further comprises a magnetic loop source secured to the vessel.

36. The apparatus of claim 31 wherein the pair of electrodes of the first electromagnetic source are configured for placement at different depths in a body of water, and wherein the pair of electrodes of the second electromagnetic source are configured for placement along or near a bottom of the body of water, and wherein the pair of electrodes of the third electromagnetic source are configured for placement along or near the bottom of the body of water.

* * * * *